United States Patent [19]

Rode et al.

[11] Patent Number: 5,720,970

[45] Date of Patent: Feb. 24, 1998

[54] METHOD FOR SUPPLEMENTING AMINO ACID LEVELS IN RUMINANT ANIMALS

[75] Inventors: Lyle M. Rode, Lethbridge, Canada; William E. Julien, Omaha, Nebr.; Hiroyuki Sato; Takeshi Fujieda, both of Kawasaki, Japan; Hiroyuki Suzuki, Urbana, Ill.

[73] Assignee: Ajinomoto Co., Inc., Tokyo, Japan

[21] Appl. No.: 427,718

[22] Filed: Apr. 21, 1995

Related U.S. Application Data

[63] Continuation of Ser. No. 18,250, Feb. 16, 1993, abandoned.

[51] Int. Cl.$^6$ .................................................. A23K 1/18
[52] U.S. Cl. ............................................. 424/438; 426/807
[58] Field of Search ................................ 424/438; 426/807

[56] References Cited

U.S. PATENT DOCUMENTS

| | | | |
|---|---|---|---|
| 3,959,493 | 5/1976 | Baalsrud | 426/2 |
| 4,797,288 | 1/1989 | Sharma | 424/476 |
| 4,837,004 | 6/1989 | Wu | 424/438 |
| 4,842,863 | 6/1989 | Nishimura | 424/438 |
| 4,937,083 | 6/1990 | Itagaki | 426/69 |
| 4,957,748 | 9/1990 | Winowiski | 426/2 |
| 4,976,976 | 12/1990 | Itagaki | 426/69 |
| 5,093,128 | 3/1992 | Draguesku | 424/438 |
| 5,145,695 | 9/1992 | Smith | 426/2 |
| 5,219,596 | 6/1993 | Smith | 426/2 |
| 5,227,166 | 7/1993 | Ueda | 424/438 |

OTHER PUBLICATIONS

Carl E. Polan et al, "Responses of Dairy Cows to Supplemental Rumen–Protected Forms of Methionine and Lysine", Journal of Dairy Science, vol. 74, No. 9, pp. 2997–3013, (Sep. 1991).

P.H. Robinson et al, "Supplemental Rumen–Protected Amino Acids for Early Lactation Dair Cattle", Journal of Dairy Scient, vol. 75, No. 1, p. 199, (1992).

J.A. Rogers et al, "Producting Responses of Dairy Cows Fed Various Amounts of Rumen–Protected Methionine and Lysine", Journal of Dairy Science, vol. 72, No. 7, pp. 1800–1817 (1989).

C.J. Canale et al, "Dietary Fat and Ruminally Protected Amino Acids for High Producing Dairy Cows", Journal of Dairy Science, vol. 73, No. 1, pp. 135–141 (Jan. 1973).

S.S. Donkin et al, "Rumen–Profected Methionine and Lysine: Effects on Animal Performance, Milk Protein Yield, and Physiological Measures," Journal of Dairy Science, vol. 72, No. 6, pp. 1484–1491 (1989).

J.M. Chow et al, "Effect of Rumen–Protected Methionine and Lysine on Casein in Milk—When Diets high in Fat or Concentrate are Fed", Journal of Dairy Science, vol. 73, No. 4, pp. 1051–1061 (1990).

J.A. Rogers et al, "Plasma Amino Acids and Milk Protein Production by Cows Fed Rumen–Protected Methionine and Lysine", vol. 70, No. 4, pp. 789–798 (1987).

B. Guillaume et al, "Raw or Extruded Soybeans and Rumen–Protected Methionine and Lysine in Alfalfa–Based Diets of Dairy Cows", vol. 74, No. 6, pp. 1912–1922 (1991).

"Rumen By–Pass Methionine for Dairy Cattle", English Translation of Feeding, vol. 26, No. 1, pp. 66–68 (1986).

J.E. Wohlt et al, "Influence on Performance when Extruded Whole Soybeans or Soybean Meal are Fed Durinng Early Lactation", Journal of Dairy Science, vol. 76, Supp. No. 1, p. 205 (1993).

(List continued on next page.)

Primary Examiner—J. Gabrielle Phelan
Attorney, Agent, or Firm—Oblon, Spivak, McClelland, Maier & Neustadt, P.C.

[57] ABSTRACT

A method for supplementing the amino acid levels in ruminants is provided where rumen-protected amino acids, particularly lysine and/or methionine, are used to supplement ruminant feed.

17 Claims, 6 Drawing Sheets

OTHER PUBLICATIONS

*David P. Casper,* "Response of Early Lactation Dairy Cows Fed Diets Varying in Source of Nonstructural Carbohydrate and Crude Protein", Journal of Dairy Science, vol. 73, No. 4, pp. 1039–1050 (1990).

*M. Hein et al,* "Evaluation of a Pellet Formulated to Replace Whole Cottonseed in the Diet of Dairy Cows in Early Lactation," Journal of Dairy Science, vol. 73, No. 9, pp. 2460–2469 (1990).

*David P. Casper et al,* "Response of Early Lactation Cows to Diets that Vary in Ruminal Degradability of Carbohydrates and Amount of Fat," vol. 73, No. 2, pp. 425–444 (1990).

*Helene V. Petit,* "Effects of Grain Level and Protein Source on Yield, Feed Intake and Blood Traits of Lactating Cows Fed Alfalfa Silage," Journal of Dairy Science, vol. 74, No. 6, pp. 1923–1932 (1991).

*M.A. Faldet et al,* "Feeding Heat–Treated Full Fat Soybeans to Cows in Early Lactation", Journal of Dairy Sciene, vol. 74, No. 9, pp. 3047–3054 (1991).

*M.J. Arambell et al,* "Effect of Yeast Culture on Nutrient Digestbility and Milk Yield Response in Early– to Midlactation Dairy Cows", Journal of Dairy Science, vol. 73, No. 6, pp. 1560–1563 (1990).

*R.A. Erdman et al,* "Effect of Dietary Rumen–Protected Choline in Lactating Dairy Cows", Journal of Dairy Science, vol. 74, No. 5, pp. 1641–1647 (1991).

*R.L. Munneke et al,* "Lactional Evaluation of Ruminally Protected Methionine in Diets Containing Extruded Soybeans and Urea", Journal of Dairy Science, vol. 74, No. 1, pp. 227–233 (1991).

METHOD FOR SUPPLEMENTING AMINO ACID LEVELS IN RUMINANT ANIMALS

This application is a continuation of application Ser. No. 08/018,250, filed on Feb. 16, 1993, now abandoned.

BACKGROUND OF THE INVENTION

1. Field of the Invention

The present invention relates to a method for supplementing amino acids in ruminant animals. More specifically, the present invention relates to a method wherein a rumen-protected feed additive composition comprising methionine and/or lysine is added to feed which is then fed to the ruminant prior to or after calving and continuing into the ruminant's lactation period. This method increases the digestible amino acids available in the feed and positively increases the milk production of ruminants who are fed the additive. The method also improves ruminant health and appetite.

2. Description of the Background Art

A ruminant is an animal which possesses a complex stomach consisting of four morphologically distinct compartments. These compartments are rumen, reticulum, omasum and abomasum. The former two are derived from the terminal portion of the esophagus, and only the latter two are considered to be a genuine stomach. After passing the first two compartments, the food is returned to the mouth. The rumen and the reticulum are fermentation compartments wherein *Ophryoscolex Diplodinium* and *Plectridium cellulolyticum* are commensal, and the digestion of the feed (vegetable tissues) is conducted by cellulase, amylase, or cellobiose secreted by these microorganisms (digestive symbiosis).

In ruminant animals like cattle or sheep, there is a problem that occurs when a biologically active substance is, for instance, orally administered: a substantial part of the substance (e.g., proteins, amino acids, etc.) are decomposed to ammonia or carbon dioxide gas by microorganisms in the rumen, making it difficult or impossible for the animal to effectively utilize all of the administered proteins and amino acids contained in feed, etc. Thus, a ruminant only receives the benefit of a portion of the nutrients fed to it and loses a portion to the support and formation of rumen microorganisms. While the nutrients (proteins, etc.) contained in feed clearly contribute to a ruminant's sustenance, another source of nutrition for ruminants is the protein derived from those microorganisms in the rumen which are passed to the lower stomachs. Accordingly, it is important to maintain the microorganism population in the rumen in order to provide a constant source of this protein.

When special nutrients or drugs which must be absorbed or metabolized are administered to ruminants it is important to protect these substances from the environmental conditions in the first stomach: i.e., from decomposition by microorganisms and from the influence of weakly acidic or weakly alkaline pH, so that the substance can be maintained intact until it reaches the intended digestive or absorptive site. Namely, it is desirable that certain nutrients and drugs pass through the rumen to the omasum without being affected by microorganisms, digestion being conducted in the abomasum with the digested feed being absorbed by the small intestine. Nutrients, etc., protected in such a manner are well known in the art and are described in U.S. Pat. Nos. 4,976,976, 4,937,083, 3,619,200, 5,093,128, 4,837,004, 3,959,493, 4,842,863, 5,023,091, 4,957,748, 4,797,288 and 5,064,665, and U.S. Ser. No. 07/820,379 (Atty Docket 10-536-0), all of which are incorporated herein by reference, and Japanese Laid-Open patents 59-66842, 58-175449, 56-154956, 63-317053, 60-168351, 59-198946, 02-027950, 02-128654, 02-128655, 03-058755, 03-155756, 03-155757, 04-079844 and 05-023114 also incorporated herein by reference.

All proteins present in animals are constituted by combinations of more than 20 different amino acids. Among these, ten "essential" amino acids are not adequately synthesized in the animal body, and the animals must take them in. The amino acids constituting a certain protein are specific to the protein and cannot be changed. Accordingly, among the essential amino acids, the one(s) in least supply control the amount of protein(s) produced by the animal. When essential amino acids are lacking in the ruminant diet the ruminant's health, milk production, etc. are all negatively affected.

Since increasing the milk production of lactating dairy cattle is an ongoing challenge facing the dairy industry, many attempts have been made to provide a method for doing so. For example, Smith et al (U.S. Pat. No. 5,145,695) provide a method wherein a particular feed composition which delivers an improved balance of essential amino acids post-ruminally is fed to a cow. Nissen (U.S. Pat. No. 4,758,593) discloses a method wherein lactating domestic mammals are fed ketoisocaproate to improve the quantity and quality of milk produced. Kantor (U.S. Pat. No. 4,704,276) provides a method wherein lactating ruminant animals are fed certain antibiotics in order to increase lactation. Palmquist et al (U.S. Pat. No. 4,642,317) discloses a process of feeding ruminant animals increased amounts of fat while they are lactating in order to increase milk yield. Similarly, Mantha (U.S. Pat. No. 4,175,121) discloses a process wherein essential nutrients, a methionine hydroxy analog, minerals, vitamins, proteins, *Aspergillus oryzae* and a buffer are fed to lactating cows to improve overall milk production. Rawlings et al (U.S. Pat. No. 4,225,620) describe a method wherein an alkali treated proteinaceous feed supplement is fed to ruminant animals so as to promote milk production. Finally, Cummins (U.S. Pat. No. 4,388,327) describes a process wherein the weight of milk produced by dairy cattle can be increased by supplementing the diets of cattle with γ-methylmercapto-α-hydroxybutyric acid and its oligomers starting two weeks prior to the scheduled date of calving and for 112 days of production. All of the references described above are incorporated herein by reference.

OBJECTS OF THE INVENTION

It is an object of the present invention to provide a method for supplementing amino acid levels in ruminant animals by feeding said animals a rumen-protected amino acid-supplemented feed.

Another object of the present invention is to increase and maintain the health of ruminant animals by feeding said animals a diet supplemented with rumen-protected amino acids.

Another object of the present invention is to increase a ruminant's milk production by feeding said ruminant animal a base feed which has been supplemented with rumen-protected methionine and/or rumen-protected lysine.

Various other objects, features and attendant advantages of the present invention will be more fully appreciated as the same becomes better understood from the following summary and detailed description of the invention.

SUMMARY OF THE INVENTION

The present invention is based upon the discovery that the health, appetite, quantity and quality of milk, etc., in ruminant animals can be improved by administering a rumen-protected feed additive comprising lysine and, optionally, methionine thereto. Such administration may begin at any time: for example 60, 30, 10 or 5 days prior to parturition or 1, 10, 20 or 29 days after calving and may continue, for example, 30, 60, 100, 150, 200, or 305 days into the lactation period, with a minimum administration time of 2 days. A preferred feeding period is the period beginning in the ruminant's late gestation period (approximately 3 weeks prior to the scheduled parturition date) and continuing for 30, 100, 150, 160 or 305 days into the ruminant's lactation period. While improving the milk production of dairy cattle, particularly high-producing dairy cattle, is an important commercial application of the present invention, it can also be advantageously used with all other female ruminants that produce milk such as sheep, water buffalo and goats.

The present invention is preferably practiced by combining a rumen-protected methionine and/or lysine composition with a standard animal feed wherein a methionine and/or lysine core composition is protected with a coating of lecithin, at least one inorganic substance which is stable in neutrality and soluble under acidic conditions, and at least one substance selected from saturated or unsaturated monocarboxylic $C_{14}$–$C_{22}$ acids, salts thereof, hardened vegetable oils, hardened animal oils, and waxes, wherein the methionine to lysine ratio in the core, when methionine is present, is from 1/10 to 10/1, preferably 1/3. It is also preferably practiced with a rumen-protected methionine/lysine composition wherein the core is coated with substances including a polymer as described in U.S. Pat. No. 4,996,067 and U.S. Pat. No. 4,937,083, both incorporated herein by reference.

DETAILED DESCRIPTION

The feed additive of the present invention comprises a rumen-protected amino acid (RPAA) additive comprising a core of lysine and/or methionine, which additive has been protected from digestion in the rumen of ruminant animals by a coating. Any rumen-protective coating may be used to keep the lysine and methionine from being digested in the rumen. A preferred protective coating is one of lecithin, at least one inorganic substance which is stable in neutrality and soluble under acidic conditions, and at least one substance selected from straight- or branched-chain saturated or unsaturated $C_{14}$–$C_{22}$ monocarboxylic acids, salts thereof, hardened vegetable oils, hardened animal oils, and waxes. This material is prepared as described in U.S. Ser. No. 07/820,379 (incorporated herein by reference) and provided as particles of from 0.1–30 mm in diameter, preferably 1–3 mm, with a specific gravity of 1.1–1.8, preferably 1.2–1.3. The particle size and specific gravity of the RPAA additive may be adjusted to preferably provide a residence time of between 10 and 14 hours for the RPAA in the rumen of the animal, preferably 12 hours, before proceeding to the lower stomachs for digestion/absorption.

In another embodiment, the present invention relates to the use of a RPAA feed additive as described above, wherein the lecithin is present in an amount of from 0.1% to 20% by weight and the inorganic substance is used in an amount from 0.1 to 10% by weight, based on the weight of the coating composition. In yet another embodiment, the present invention relates to the RPAA feed additive described above wherein the inorganic substance is calcium or magnesium carbonate or a calcium salt of pyrophosphoric acid.

Examples of suitable monocarboxylic acids useful in the above-described preferred coating composition include myristic acid, palmitic acid, stearic acid, oleic acid, linoleic acid, and behenic acid. Salts of these may also be used. Examples of hardened vegetable oils include hardened palm oil, hardened soybean oil, hardened rapeseed oil, and hardened castor oil. Examples of hardened animal oils are hardened beef tallow and hog fat. Examples of waxes are carnauba wax and beeswax, natural waxes, synthetic waxes, and paraffin waxes. The lecithin used in the RPAA coating is not required to be pure. A mixture of phosphatidyl choline, phosphatidyl ethanolamine and phosphatidyl inositol may be used. Preferably, it may be prepared from soybean and egg yolk. Examples of the inorganic substance which are stable under neutral conditions and soluble under acidic conditions include magnesium carbonate, calcium carbonate, calcium phosphate, calcium pyrophosphate and mixtures thereof. Carbonates such as magnesium carbonate, calcium carbonate and the calcium salt of pyrophosphoric acid are preferred.

The preferred coating composition described above is such that, on the basis of all coating materials, it comprises 0.1 to 20% by weight of lecithin, 0.1 to 10% by weight of the inorganic substance which is stable under neutral conditions and soluble under acidic conditions, preferably 1 to 10% of lecithin and 1 to 10% of the inorganic substance. If the amount of lecithin in the coating materials exceeds 20% by weight, the strength of the coating layer is decreased and the protectiveness in the rumen is reduced. If the amount of lecithin is less than 0.1% by weight, the emulsification action is insufficient, and the dissolving action in the abomasum and subsequent digestive tract decreases. If the amount of the inorganic substance which is stable under neutral conditions and soluble under acidic conditions exceeds 10% by weight, the protectiveness in the rumen decreases. If it is below 0.1% by weight, the action of the inorganic substance inside of the abomasum is insufficient.

Other preferred coating compositions useful in the present invention include the one described in U.S. Pat. No. 4,966,067, directed to a feed additive for ruminants which comprises cores containing an acid salt of a basic amino acid, and a first coating layer and a second coating layer coated sequentially on the surface of each core, wherein said first coating layer contains at least one first coating agent selected from the group consisting of a neutral or weakly acidic organic substance, a substantially neutral fine powder of inorganic substance, a non-ionic hydrophilic polymer substance and an anionic hydrophilic polymer substance and being physiologically acceptable to the ruminants, and the second coating layer contains as a second coating agent a polymer soluble or swellable in water in an acidic region of a pH of at most 5.5. Another coating composition suitable for use in the present invention is the one described in U.S. Pat. No 4,937,083, directed to a core containing a carbamate of a basic amino acid and coated with a polymer coating agent soluble or swellable in water in an acidic region of a pH of at most 5. Both U.S. Pat. No. 4,966,067 and U.S. Pat. No. 4,937,083 are incorporated herein by reference, wherein the coatings and cores described therein contain the lysine and/or methionine necessary to supplement ruminant feed according to the present invention.

There is no particular restriction in the preparative method of the core containing methionine and/or lysine which is later coated. As required, a binder or a filler may be added to the amino acid(s) and granules, preferably granules close to spherical in shape, are prepared by a known granulating method such as extrusion granulation, fluidized granulation, or stirring granulation. Examples of the binder are cellulose derivatives such as hydroxypropylcellulose, methyl cellulose, or sodium carboxymethylcellulose, vinyl derivatives such as polyvinyl alcohol or polyvinylpyrrolidone, gum arabic, guaiac gum and sodium polyacrylate. Starch, proteins and crystalline cellulose may be used as the filler. If required, one or more specific gravity adjusting agents may be added such as calcium carbonate, calcium phosphonate or talc. These cores may be rumen-protected in any effective manner known in the art.

The amount of the coating materials used to coat the core substance(s) is not restricted in any particular manner. The amount should be as little as possible for economic reasons, but should be enough to fully protect the methionine and/or lysine in the rumen. Usually the amino acid cores are coated in an amount of 10 to 200 parts by weight, preferably 15 to 150 parts by weight, per 100 parts by weight of the cores containing the amino acids. Any other coating system other than the preferred one described above may be used to protect the lysine and methionine core from digestion in the rumen, such as the acid-sensitive polymers described in U.S. Pat. No. 4,937,083, the fatty acids described in U.S. Pat. No. 3,959,493, the coating composition of U.S. Pat. No. 4,837,004 and the coating described in U.S. Pat. No. 4,842,863, all of which are incorporated herein by reference. There is no particular restriction on the method of coating the methionine and/or lysine core either. It can be coated by an ordinary method such as fluidized-bed coating, pan coating or melt coating.

The lysine used to prepare the core of the RPAA feed additive may be L-lysine or DL-lysine and the methionine used to prepare the core of the RPAA feed additive may be L-methionine or DL-methionine. Other methionine sources such as glycyl-D,L-methionine, etc. (see U.S. Pat. No. 3,959,519, incorporated herein by reference) may be used in place of pure methionine, as well as the ruminant-acceptable acid addition salts of both lysine and methionine such as the HCl salts. The coated feed additive core may contain lysine, methionine or both in its core.

The methionine/lysine RPAA coated feed additive described above is mixed with a base feed commonly fed to domestic ruminant animals in an amount sufficient to supplement the metabolizable protein present in the base feed to a level sufficient to maintain the health, increase the milk production, etc., of the particular ruminant being fed, in view of its weight, lactation, desired milk composition, rate of weight loss or gain, etc. The rumen-protected methionine/lysine feed additive should be uniformly distributed throughout the feed. If both lysine and methionine are needed, they may each be separately added to the feed as single-component RPAAs or an RPAA containing both lysine and methionine in the desired ratio in its core may be added. Typical dry feed components supplemented in the present invention include mixtures of grass, legume, corn or small grain silage, legume, grass or small grain hay, grain by-products, small grains, oil seeds and oil seed meals like corn grain, eared corn, shelled corn, barley, sorghum grain, soybean meal, cotton seed, corn gluten meal, corn silage, grass silage, alfalfa hay, prairie hay, etc. After mixing the present invention rumen-protected amino acid methionine/lysine feed additive with the dry feed, the feed material may be further processed, such as by conversion to pellets, etc.

The amount of RPAA feed additive added to a base feed depends upon a number of factors and is calculated as the difference between the animal's amino acid requirement and the amount of amino acids supplied by the animals' feed and the amount in the animal's reserve. In general, the amount added of RPAA is the amount necessary to meet requirements for growth, maintenance, productivity and health. This amount may be based upon, e.g., common experience, Government standards, academic research, etc.

For example, Heinbeck has developed a modeling system for formulating dairy rations on an amino acid basis (Degusa Technical Symposium, Saskatoon, Saskatchewan, Canada, Sep. 12, 1989, incorporated herein by reference). The model is divided into two parts: one part relates to the calculation of the amount of amino acids required for an animal's maintenance and production and the other part relates to the calculation of the amount of amino acids provided by feedstuffs.

In Heinbeck's system, the metabolizable amino acid requirement is calculated from the milk production and the maintenance requirements of the animal. The amino acid requirement for milk production is calculated based upon the amount of milk produced, its crude protein content, the amino acid content in the crude milk protein and the efficacy of metabolism. For example, according to the model a ruminant's methionine requirement based upon its milk production may be calculated as follows: for a ruminant producing 40 kilograms per day of milk containing 3.5% by weight of crude protein, said crude protein containing 2.6% by weight methionine, the net amount of methionine necessary for lactation is 4,000 g×3.5%×2.6%=36.4 g. The efficacy of metabolism of methionine is 70%; thus the amount of methionine necessary for this particular ruminant's lactation is 36.4 g/0.7=52 g. This required amount of methionine is added to the amount of methionine the ruminant requires for maintenance, which is estimated from literature crude protein requirements and the amino acid composition of meat to be approximately 7 grams. Thus, the methionine requirement for a ruminant producing 40 kilograms of milk per day having 3.5% crude protein is 59 grams per day (the summation of the methionine requirement for milk production and maintenance).

The amount of amino acids delivered by feedstuffs according to the model may be calculated by summing the amino acid content of the feed ingredients, said amino acid content being known in the literature and/or calculatable by, e.g., amino acid analysis. This feedstuff amino acid is reduced by the efficacy of metabolism, etc. and added to the amount of amino acids delivered which are derived from the microbial crude protein metabolized by the ruminant to provide the total amount of amino acids the ruminant receives. For example, the amount of rumen bypassed methionine (the amount of methionine which passes the rumen and is metabolized by the ruminant) calculated for the following feed for the above-described ruminant (including microbial protein)

| ALFALFA HAYLAGE | 17.6 |
| --- | --- |
| GRASS HAY | 16 |
| HM CORN | 9.56 |
| CONCENTRATE | 36.4 | was 52.5 grams.

Accordingly, since the feedstuff described above provides 6.5 g/day of methionine less than required (89% of daily requirement), the above-described feed, according to the present invention, would be supplemented by the RPAA to provide this 6.5 g/day of rumen-stable methionine. The amount of lysine required, the amount of lysine supplied by the feed, and the amount of lysine needed to supplement the feed is calculated in the same way.

Another method available for calculating ruminant requirements and feedstuff supply is the Cornell Net Carbohydrate and Protein System for Evaluating Cattle Diets (Search: Agriculture. Ithaca, N.Y.: Cornell Univ. Agr. Exp. Sta. No. 34. 128 pp. 1990, ISSN 0362-2754, incorporated herein by reference) which provides a model for predicting cattle requirements and feedstuff utilization designed to be used for adjusting cattle nutrient requirements and calculating utilization over wide variations in breed, feed, management, environmental conditions, etc. The model is available on a computer spread sheet and may be applied to both beef and dairy cattle at different levels and types of production. The Cornell model allows one to calculate the metabolizable protein for, e.g., dairy cattle based upon their breed, weight at birth, gross weight, etc., in view of the particular circumstances of the individual cow (i.e., whether the cow is simply in a maintenance cycle, a lactation cycle, a weight-gain period, etc). The model also provides animal responses to given diets based upon feed composition, digestion rates, digestible protein (based upon both digestible feed and digested bacterial protein which has escaped from the rumen), etc. The metabolizable protein required by a particular ruminant is thus calculated and may be compared with the calculated amount of metabolizable protein provided by a given feed. When the feed provides a lower amount of metabolizable protein than is required by a particular cow based upon its physical condition, lactation stage, etc., the feed is then supplemented by the RPAA feed additive described above to the required level.

The amount of RPAA feed additive added to the base feed is calculated by converting the amount of metabolizable protein lacking in the diet into the amount of ruminally-protected methionine and/or lysine necessary to make up for this deficiency. This conversion may be accomplished by, for example, conducting an amino acid analysis of the digestible protein supplied by a feed by first separating the protein fractions of the feed into rumen-degraded and rumen degradation-resistant fractions according to the method described in Chlupa et al (1991 Cornell Nutrition Conference for Feed Manufacturers, p. 44, incorporated herein by reference) or by the method described in the Cornell Net Carbohydrate and Protein System described above. In the alternative, the amount of methionine and lysine a particular ruminant requires may be calculated by summing the amount of methionine and lysine required for lactation and maintenance calculated by the Cornell model.

For example, a ruminant producing 88 pounds per day of milk containing 3.05% crude protein needs 88 lb×453.6 g/lb ×3.05%=1220 g/day of crude protein to replenish the amount given daily in the milk. The percentage of lysine and methionine in the crude milk can be analyzed and multiplied by the amount of crude protein necessary for lactation to provide the minimum lysine and methionine requirement for lactation. This number is then adjusted for the efficiency with which the ruminant metabolizes its intake methionine and lysine. For example, for milk having crude protein which is 2.7% methionine and 8.3% lysine, and knowing that the efficiency of digestible methionine and lysine for the ruminant is 75%, the amount of methionine necessary to satisfy the ruminant's lactational requirements is (1220 g/day ×0.027)÷0.75=43.9 g. The amount of lysine may be similarly calculated to be 135.0 g. Of course, the ruminant must also maintain itself, and it requires protein to do so. This maintenance requirement may be calculated based upon the Cornell model described above as the summation of the scarf, urine and feces protein required for the particular ruminant. This protein requirement is then multiplied by 0.027 to determine the methionine requirement and 0.083 to determine the lysine requirement. In order to fully calculate the metabolizable protein required the Cornell fecal protein requirement is added to the above scarf, urine and feces requirement to provide a total amount of protein required which is again multiplied by 0.028 (methionine) or 0.082 (lysine) to determine the total amount of methionine and lysine required.

The metabolizable amino acid supplied to the ruminant may also be calculated according to the Cornell method and includes summing the amount of lysine and methionine which comes from the digested bacterial protein with that which comes from the feed and which bypasses the rumen. The Cornell method provides the total bacterial protein a ruminant receives in the lower stomach, and this total may be converted to methionine and lysine by multiplying by the factors of 0.028 and 0.082, respectively. Similarly, the Cornell model provides the total amount of rumen bypass protein originating from feed based upon the particular composition of a feed, and the amount of methionine and lysine delivered may be calculated based upon the amount of methionine and lysine contained in the digestible protein fractions of each particular feed component.

In this way it is clear how much rumen-protected lysine and rumen-protected methionine may be added to a base feed which is fed to ruminants according to the present invention. Of course, lesser and excess amounts may be added, as desired.

Once the RPAA supplemented feed has been prepared, it is fed to ruminant animals. Several administration periods are effective. One period begins just prior to the onset of lactation (calculated from breeding records; usually approximately 3 weeks (approximately 21 days) prior to parturition) and extends 30, 100, 160 or up to 305 days into the animal's milk production period. The starting point of feed supplementation is chosen to provide a maximal titre in the ruminant's blood when parturition occurs. Another effective period begins 29 days after calving and continues 100 or 150 days into the lactation period. Other possible start and end dates were described above and include dates 2 days after the above-described start dates, and dates 2 days before the above-described end dates. The amount of methionine/lysine RPAA-supplemented feed fed to the ruminant animals during this period should range between 3.0 to 5.0 percent of the animal's body weight, i.e., about 40–80 pounds of 100% dry material per day for an average dairy cow.

Having generally described this invention, a further understanding can be obtained by reference to certain specific examples which are provided herein for purposes of illustration only and are not intended to be limiting.

EXAMPLES

Examples 1 and 2

Preparation of rumen-protected amino acid (RPAA) feed additive

Example 1

A kneader was charged with 325 g of L-lysine hydrochloride, 172.5 g of talc, 2.5 g of sodium carboxymethylcellulose and 1345 g of water. They were kneaded and then by using an extruder having a screen with an opening size of 1.5 mm, a cylindrical granule was obtained. The granule obtained was molded by using a spherical granule producing machine (Marumerizer, Fuji Paudal Co., Ltd.) to obtain a granule similar to a spherical shape. The resulting spherical granule was dried by fluidized-bed dryer to obtain a core containing L-lysine hydrochloride.

5 parts by weight of lecithin (soybean lecithin, manufactured by WAKO pure chemical industries, ltd.—food additive—was used) and 5 parts by weight of magnesium carbonate was dispersed in 90 parts by weight of melted hardened beef tallow. This coating material was coated on the L-lysine hydrochloride core in an amount of 67 parts by weight per 100 parts of the core (the rate of coating 40%). A fluidized-bed coater (New Marumeizer, Fuji Paudal Co., Ltd.) was used.

Example 2

The preparation of a RPAA feed additive was conducted in the same manner as in Example 1 except that calcium carbonate was used instead of magnesium carbonate.

Example 3

A RPAA according to U.S. Pat. No. 4,996,067 was prepared as follows:
(a) Granulation of the core material Into a centrifugal fluidized granulation coating apparatus (CF-360, Freund Sangyo K.K.), 180 g of crystals of L-lysine hydrochloride having a particle size of from 20 to 24 mesh were charged as seed cores, and granulation was conducted by gradually adding 2,200 g of a 10:1 mixture of L-lysine hydrochloride and fine crystalline cellulose (disintegrator) under rotation while spraying 1,630 g of a 4% aqueous solution of hydroxypropyl cellulose as a binder. The granules thus obtained were dried in a fluidized bed dryer until the water content became less than 1% by weight and classified, by means of a standard sieve to obtain granules of from 10 to 12 mesh containing 89.5% of L-lysine hydrochloride.

The content of the amino acid in the particles was obtained by dissolving 1 g of the sample in 200 ml of the Clark Lubs buffer solution and quantitatively analyzing the content by high performance liquid chromatography.
(b) First coating 2,000 g of the granules of L-lysine hydrochloride obtained in the above step (a) were charged into a centrifugal fluidized granulation coating apparatus, and coating treatment was conducted by supplying 880 g of a fine powder of D,L-methionine as the first coating agent under rotation, while spraying 1,000 g of a 4% aqueous solution of hydroxypropyl cellulose as a binder, followed by drying in a fluidized bed dryer, to obtain a first coating product having a particle size of from 9 to 10 mesh coated with D,L-methionine containing 64.5 of L-lysine hydrochloride, 25.8% of D,L-methionine and 9.7% of cellulose + hydroxypropyl cellulose.

Among the components in the particles, amino acids were quantitatively analyzed by the method as described in the step (a). The amounts of other components were obtained by subtracting the amounts of amino acids from the weight of the particles.
(c) Second coating A mixture comprising a copolymer (reduced viscosity at a concentration of 0.5 g/dl in ethanol: $\eta_{sp/c}$ =1.30) of 70% of 4-vinylpyridine with 30% of styrene and stearic acid (fusion-preventing agent) in a ⅙ amount of the copolymer, was dissolved in ethanol to obtain an ethanol solution having a concentration of 4%. This ethanol solution was sprayed from a nozzle, and at the same time, talc was gradually continuously supplied in small portions in the form of a powder. The solution and the talc powder (fusion preventing agent) were supplied in such amounts that the weight ratio of the copolymer:talc powder:stearic acid would be 30:65:5 and used as the second coating agent.

600 g of the first coating product obtained in the above step (b) was supplied to a fluidized coating apparatus and a second coating layer was formed thereon by means of 2,060 g of the ethanol solution of the copolymer and stearic acid and 192 g of talc powder. After coating, the coated product was dried at 70° C. for 5 hours to obtain 833 g of a second coating product. The proportion of the second coating layer in the entire particles, was 28%.

The specific gravity (as measured by an air comparative type specific gravity meter, the same applies in the subsequent Examples) of the particles of the second coating product thus obtained was 1.10.

The coating apparatus is connected with a suction duct for waste gas, whereby the polymer solution sprayed in the coating apparatus and the fine solid particles added during the formation of the first coating layer or the second coating layer, are effectively used, and the proportion of the materials deposited is usually from 70 to 90%, although it varies depending upon the operational conditions. In the following Examples and Comparative Examples, the amount to be coated was predetermined prior to the coating operation. To form a coating layer of a predetermined amount, after the coating, the coated product was dried in a hot air-circulating oven at 70° C. for 5 hours, then the weight was measured at room temperature to obtain the coated amount, and the operational cycle of coating-drying-weight measurement was repeated until the predetermined amount was obtained.

The feed additive thus obtained was subjected to shaking in the McDougall buffer solution at 39° C. for 24 hours, whereupon L-lysine hydrochloride and D,L-methionine in the feed additive found to be maintained in a total amount of 97%. Further, when shaked in the Clark Lubs buffer solution at 39° C. for 2 hours, L-lysine hydrochloride and D,L-methionine eluted in a total amount of 95%, and when shaked for 3 hours, they eluted 100%.

Example 4

Multiparous, lactating Holstein dairy cows (10 cows per treatment) were used to evaluate the efficacy of being fed a rumen-protected amino acid (RPAA) described above for a certain period of time. For the first 28 days postpartum, all cows received a Negative-control (NEG) diet of alfalfa hay (2.5 kg DM/d), timothy hay (2.4 kg DM/day) and corn silage (ad libitum). Concentrate (corn, soybean meal, corn gluten meal; 18.6% crude protein) and soybean meal were fed according to production (0.35 kg concentrate/kg milk; 0.1 kg SBM/kg (soybean meal) milk above 35 kg/d). From 29 days postpartum, RPAA-supplemented cows received lysine-HCl (19 g/d) and methionine (6.5 g/d) encapsulated in a ruminally inert coating, until 150 d (RP150) or 305 d (RPAA) postpartum. Positive-control (POS) cows received an additional topdress of SBM and bloodmeal (0.4 kg/d). Compared to NEG cows, POS and RPAA cows produced more (P<0.05) milk (32.5, 34.0 and 34.7 kg/d respectively) from 29 to 150 d postpartum. Milk fat content from NEG cows was similar to POS cows, but lower (P<0.06) than for RPAA cows (3.41, 3.48 and 3.59% respectively). Milk protein content was similar among treatment groups. From 29 to 305 d postpartum, POS and RPAA-supplemented cows produced more (P<0.05) milk than NEG cows (25.9, 27.5, 28.8 and 29.7 kg/d for NEG, POS, RP150 and RPAA cows respectively), but milk composition was unaffected by treatment. The RPAA was effective in increasing milk production, and this positive effect continued after RPAA was removed from the diet.

Experimental Animals

Forty multiparious Holstein cows were used in a full lactation study. Animals were assigned to experimental treatment groups as they freshened and blocked within groups by age. The blocks were for cows entering their second lactation; third to first lactation; and sixth or greater lactation.

Experimental Diets

All cows were fed a common diet, consisting of corn silage, corn and timothy hay, for at least two weeks pre-calving. At parturition, all cows received the negative control diet (described below) until 28 days in milk. On Day 29, cows were assigned to one of four treatment groups designated as negative control (NEG), positive control (POS), negative control diet plus RPAA supplementation until Day 305 of lactation (RPAA), and negative control diet plus RPAA supplementation until Day 150 of lactation (RP150).

The NEG diet was designed to meet National Research Council (1989) recommendations for undegradable intake protein (UIP), but was deficient in methionine and lysine, as predicted by the Cornell Net Carbohydrate-Protein Model (Fox et al 1990) described above. The RPAA and RP150 diets were identical to the NEG diet except that cows were offered 0.5 kg concentrate containing 50 g rumen-protected amino acids (17 g lysine-HCl; 6.5 g D,L-methionine). Cows receiving the POS diet were fed similarly to the other diets except that an additional 400 g soybean meal-blood meal topdress. This was sufficient to provide the same level of rumen-degradable methionine and lysine as RPAA-supplemented cows.

All animals were offered, daily, corn silage ad libitum, 4 kg alfalfa hay and 4 kg timothy hay. Concentrate (Table 1) was fed according to production (1 kg concentrate per 2.5 kg milk production). A soybean meal-blood meal topdress was fed to cows according to level of milk production. Amount of concentrate and topdress was adjusted weekly for each cow. Sufficient corn silage was offered to allow for a 10% weighback of total diet. Feed refusals were weighed once per day and separated into hay and non-hay fractions. These fractions were subsampled once per week and a composite sample was used for chemical analyses.

Data Collection

Animals were weighed and scored for body condition on entry to their respective treatment groups and on a monthly basis thereafter. Milk production was recorded on a daily basis. Milk samples were collected once per week from the AM and PM milkings from each cow and submitted for compositional analysis (milk protein, fat, lactose and somatic cell count).

Corn silage was sampled weekly and all other feedstuffs were subsampled weekly and subjected to proximate analysis (crude protein, ADF, NDF, Ca, P, and DM) as described by Beauchimin et al (1991) J. Dairy Sci. 74: 3128–3139 (incorporated herein by reference). Analyses of protein fractions was accomplished by art-accepted methods.

TABLE 1

Composition of feedstuffs fed to lactating cows with or without RPAA.

| | alfalfa hay | timothy hay | corn silage | corn grain | soybean meal | beet pulp | corn gluten meal | blood meal | con- centrate |
|---|---|---|---|---|---|---|---|---|---|
| Dry matter, % | 92.1 | 92.5 | 33.8 | 93.7 | 91.8 | 92.7 | 94.1 | 93.1 | 91.5 |
| | | | | | % of DM | | | | |
| ND fiber | 40.7 | 59.3 | 50.3 | 22.4 | 12.8 | 50.5 | 17.0 | 99.2 | 28.4 |
| AD fiber | 30.3 | 40.6 | 29.1 | 4.5 | 6.5 | 27.0 | 7.4 | 7.1 | 8.1 |
| N × 6.25 | 20.7 | 12.3 | 9.5 | 11.5 | 55.2 | 11.0 | 60.3 | 81.3 | 18.6 |
| Calcium | 1.51 | 1.06 | 0.35 | 0.02 | 0.26 | 0.47 | 0.15 | 0.06 | 0.22 |
| Phosphorus | 0.26 | 0.22 | 0.22 | 0.24 | 0.78 | 0.09 | 0.45 | 0.07 | 0.38 |
| | | | | | % of total N | | | | |
| buffer sol. N | 45.2 | 43.6 | 36.0 | 18.7 | 21.0 | 32.9 | 13.5 | 7.1 | 17.6 |
| ND soluble | 79.6 | 74.2 | 89.7 | 98.4 | 90.2 | 78.8 | 94.5 | 16.5 | 89.5 |

ND fiber = neutral detergent fiber
AD fiber = acid detergent fiber
N = nitrogen

Statistical Analyses

Data analysis consisted of using repeated measures analysis on weekly milk yields, with a covariate period. The covariate value was obtained from the average milk or milk component production during Days 15 through 28 post-partum. Treatment groups RPAA and RP150 were combined as one treatment (RPAA) until 150 days post-partum. Linear contrasts were used for means separations between treatment groups. Blocks consisted of the groups of four animals, within lactation groups, that were formed as cows entered the experiment. The General Linear Model (GLM) of SAS (1990) was used for analyses of variance. Linear contrasts were used to test for treatment differences. The contrasts were RPAA vs. POS, RPAA vs. NEG, and RPAA vs. RP150 (for Days 150 to 305 postcalving). Milk yield, milk component and milk component yields were analyzed using their respective covariate measurements.

Body weight and body condition score (BCS) were statistically analyzed, except that monthly measurements were used and post-calving values served as the covariate. Feed intake and blood parameters were analyzed, using weekly averages but no covariate value was used.

RESULTS

Composition of ingredient feedstuffs fed to cows in this study (Table 1) were typical of similar feeds reported elsewhere (see the Cornell Model described above). The exception to this was the blood meal which contained >90% of the nitrogen (N) as NDF-N. This unusually high value may be due to analytical problems encountered in filtering this feedstuff. However, identical results were observed for the blood meal when analyzed by two separate laboratories. If the observed value for blood meal was not an analytical aberration, then the undegradable intake protein (UIP) of the Positive-control diet may have been greater than originally planned.

DRY MATTER intake

Dry matter (DM) intake, expressed in kg per day, was similar among all treatment groups, although there was a small numerical advantage for RPAA cows during the first 150 days postpartum. However, when DM intake is expressed per unit body weight, RPAA cows consumed more DM during the first 150 days (P<0.063) and over the entire lactation (P<0.079) than NEG cows. Conversely, POS cows consumed less DM than NEG cows.

The greatest dry matter intake for RPAA cows occurred, for the most part, during 12 to 20 weeks postcalving (8 to 16 weeks post-treatment). This corresponded with the interval of highest milk production and subsequent greatest access to concentrate. This was also the time when the body weights for RPAA cows were the lowest (mainly due to the RP150 subgroup). Conversely, POS cows did not readily accept blood meal, which may account for the lower DM consumption per unit body weight observed, as compared to NEG cows.

Milk production

Figure 1:
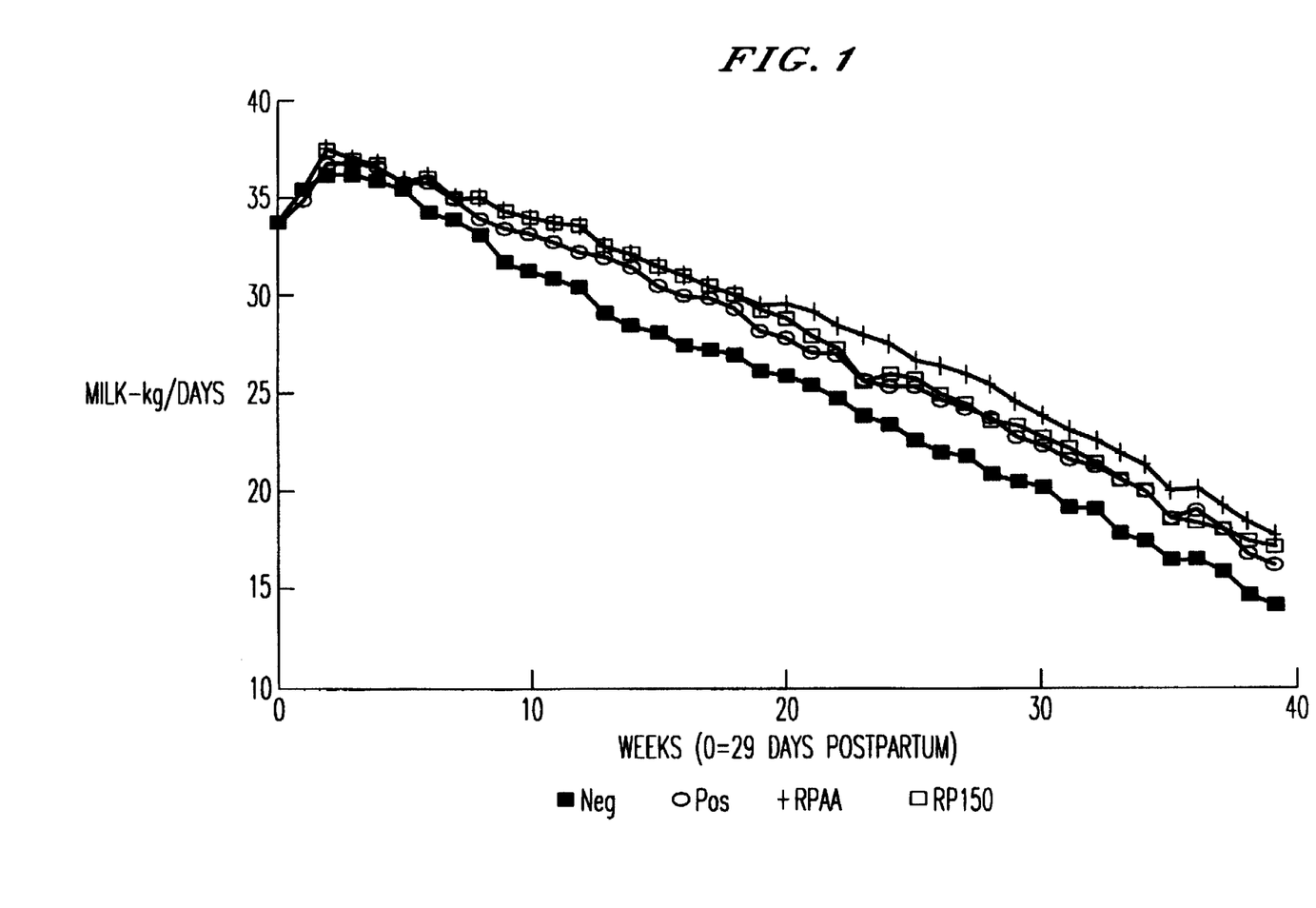
FIG. 1 represents the milk production over time from cows used in Example 4.
Figure 2:
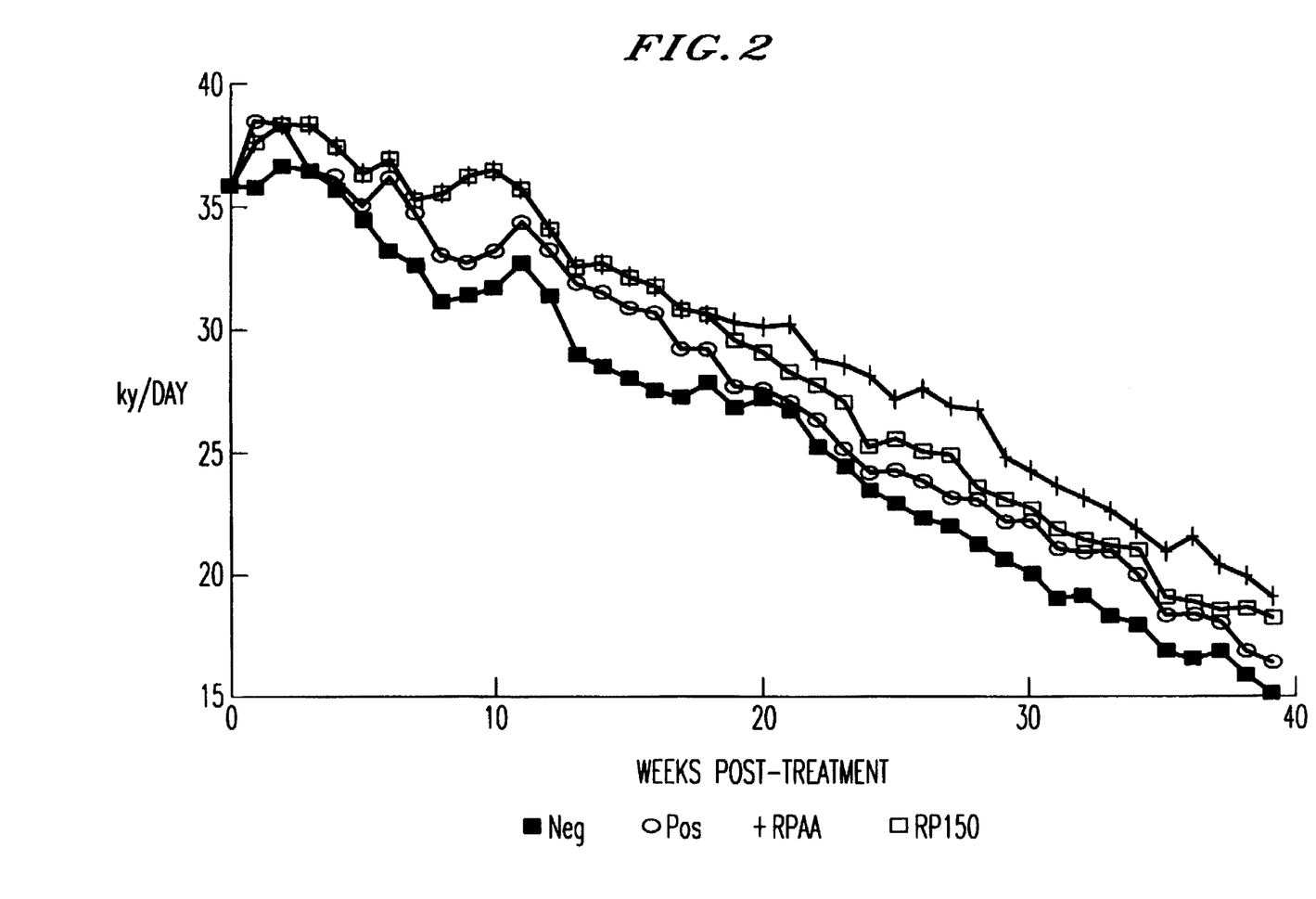
FIG. 2 represents the fat-corrected milk over time from cows used in Example 4.

Cows on the RPAA and POS treatments produced significantly more milk and fat-corrected milk (FCM) than NEG cows (FIGS. 1 and 2). Peak milk production was similar for all treatment groups, but persistency of NEG cows was lower than for other treatment groups. However, peak FCM yield was greater for RPAA and POS cows than NEG cows. Cows supplemented with RPAA were able to maintain this peak production longer than POS cows.

At 150 days postcalving (17 weeks post-treatment), RPAA was removed from the diets of RP150 cows. Milk and FCM production for RP150 cows began to decline numerically within a week. By Weeks 23 and 21, RP150 cows were producing significantly (P<0.05) less than RPAA cows for milk and FCM respectively. The production for RP150 cows declined to the level of the POS cows until the end of lactation. Despite the fact that RP150 cows were receiving the same diet as the NEG cows (no supplemental RPAA), the production level was equal to the POS cows, indicating a residual response to the RPAA after withdrawal of the supplement.

Figure 3:
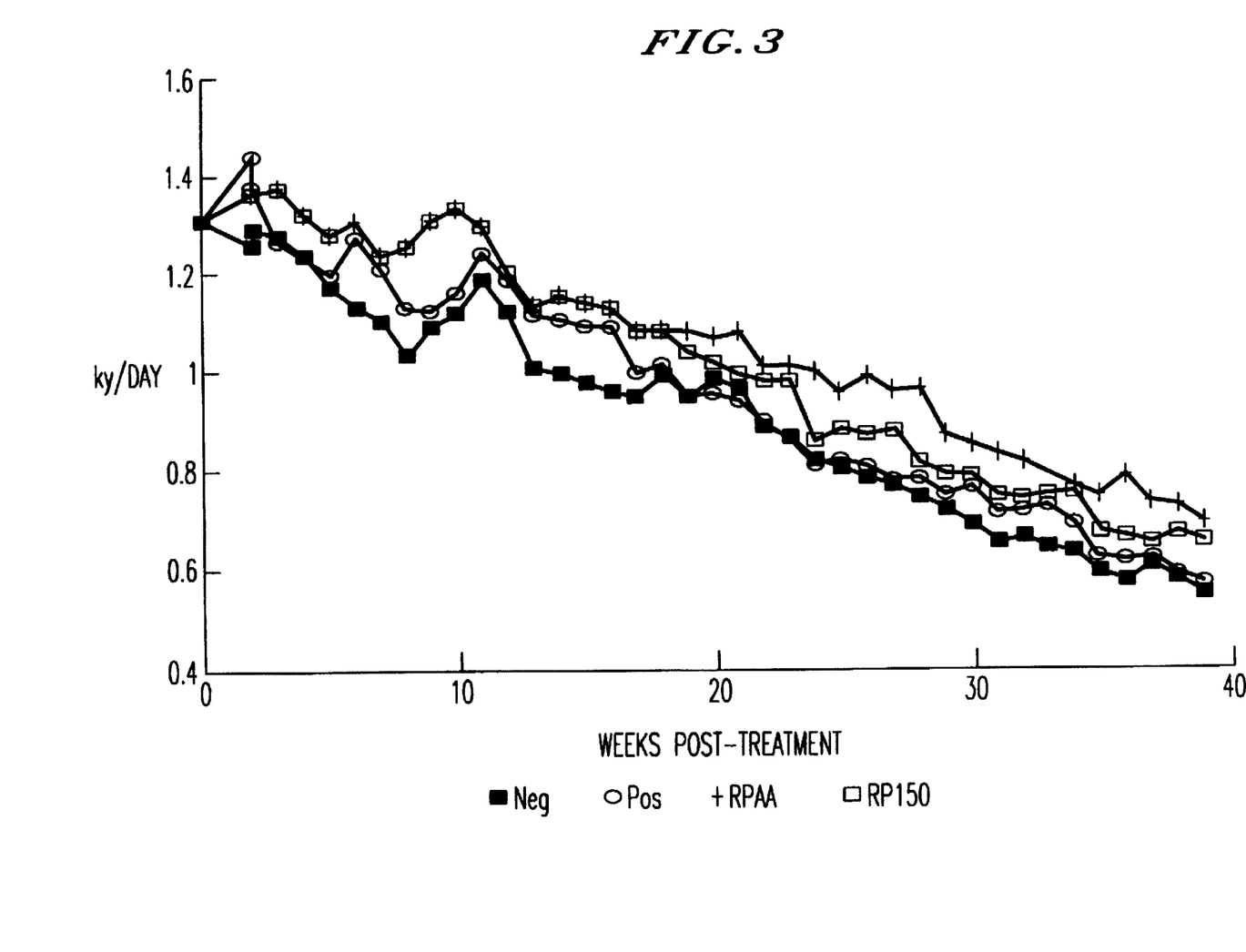
FIG. 3 represents the fat production over time from cows used in Example 4.

Fat production (FIG. 3) declined for all groups as lactation progressed. The decline was most severe for NEG cows. This would be indicative of cows deficient in energy reserves. However, the decline in body condition score was less severe for NEG cows than for other treatments. Later in lactation, POS cows were significantly lower (P<0.05) in milk fat percentage an other groups. This may have been due to the lower body reserves and relatively high milk production compared to NEG cows. This was not the case for RPAA cows, even though milk production was numerically greater for RPAA compared to POS cows. This could be attributable to the additional energy needed by POS cows to excrete extra nitrogen in the urine, or a beneficial effect of RPAA supplementation to maintaining milk fat percentage despite losses in body condition.

Overall, RPAA cows produced more fat (kg/d) and had a higher milk fat percentage than NEG cows. There was a trend toward higher fat production for RPAA compared to RP150 cows. This difference was primarily due to differences in milk yield. Similarly, POS cows produced more milk fat than NEG cows, which was related to milk volume rather than fat percentage.

Figure 4:
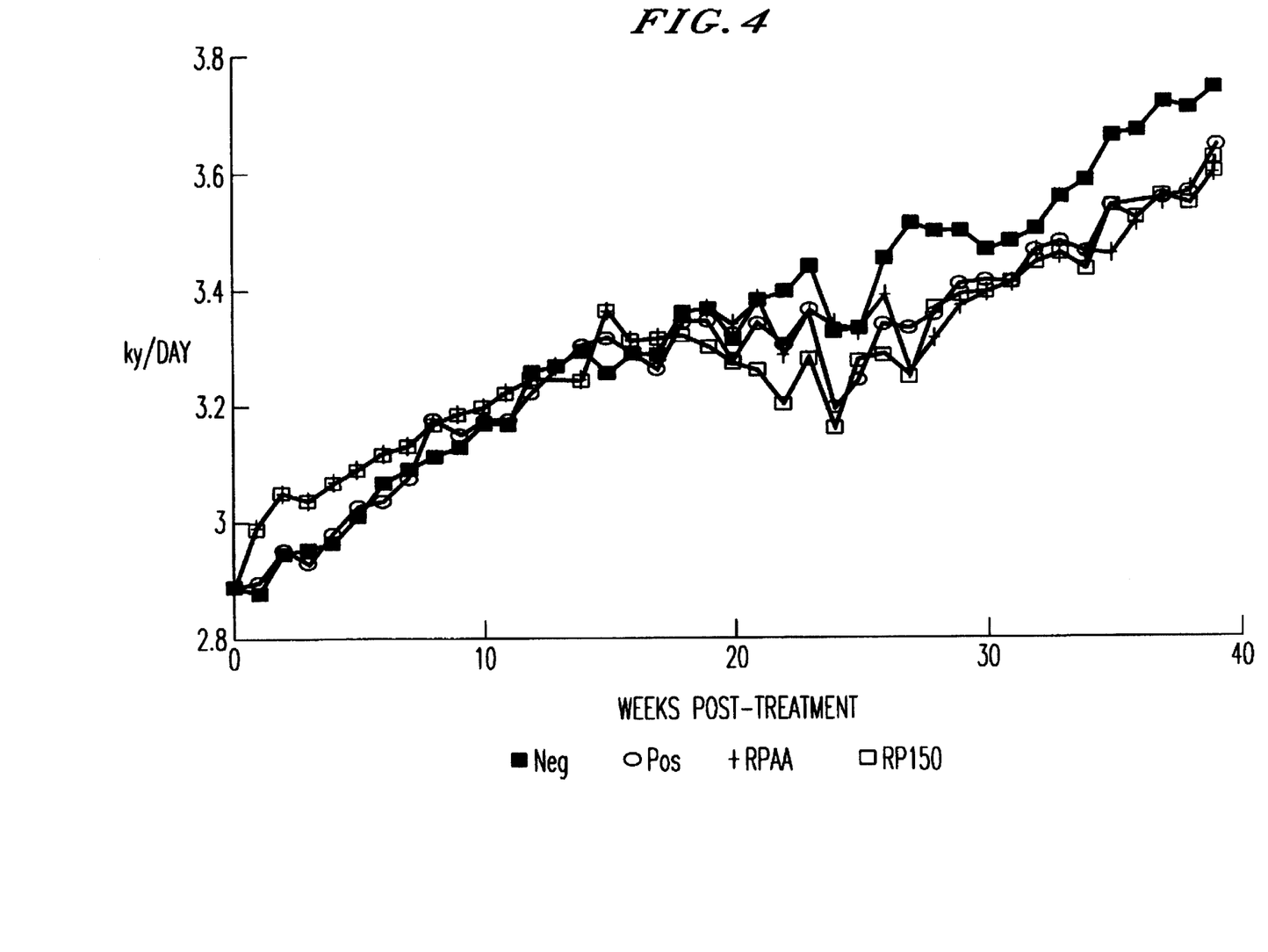
FIG. 4 represents the protein percent over time from cows used in Example 4.

Milk protein production was greater for RPAA and POS cows compared to NEG cows (Table 2). However the level of significance was greater for the RPAA compared to protein supplementation (P<0.001 and 0.062 respectively). There was a trend toward more milk protein production when RPAA was fed for the entire lactation compared to Day 150. This difference Is attributable to differences in milk volume and to the decrease in milk protein content in RP150 cows, observed when RPAA was withdrawn from the diet (FIG. 4).

TABLE 2

Mean (covariate adjusted) milk protein production and milk protein percentage for groups of cows, supplemented with or without RPAA.

| | Protein production | | | | |
|---|---|---|---|---|---|
| | kg/d | | | % of Neg-control | |
| | Days of lactation | | | Days of lactation | |
| | 29–150 | 29–305 | SEM[2] | 29–150 | 29–305 |
| Neg-control | 1.009 | 0.853 | — | — | — |
| Pos-control | 1.060 | 0.908 | — | 105.0 | 106.4 |
| RP150 | — | 0.928 | — | — | 108.8 |
| RPAA | 1.098 | 0.955 | — | 108.8 | 112.0 |
| Significance | | | | | |
| N vs P[3] | .071 | .062 | .011 | | |
| N vs R[4] | .006 | <.001 | .009 | | |
| R vs R150[5] | — | .164 | .012 | | |

| | Protein percentage | | | | |
|---|---|---|---|---|---|
| | % | | | % of Neg-control | |
| | Days of lactation | | | Days of lactation | |
| | 29–150 | 29–305 | SEM | 29–150 | 29–305 |
| Neg-control | 3.12 | 3.34 | — | — | — |
| Pos-control | 3.13 | 3.29 | — | 100.2 | 98.5 |
| RP150 | — | 3.29 | — | — | 98.6 |
| RPAA | 3.17 | 3.30 | — | 101.6 | 99.0 |
| Significance | | | | | |
| N vs P | NS | NS | .061 | | |
| N vs R | NS | NS | .048 | | |
| R vs R150 | — | NS | .045 | | |

[1]Covariate period consisted of Days 14 through 28 of lactation.
[2]Standard error of the mean.
[3]Linear contrast of Negative-control vs. Positive-control treatment groups.
[4]Linear contrast of Negative-control vs. RPAA treatment groups.
[5]Linear contrast of RPAA vs. RP150 treatment groups.

Figure 5:
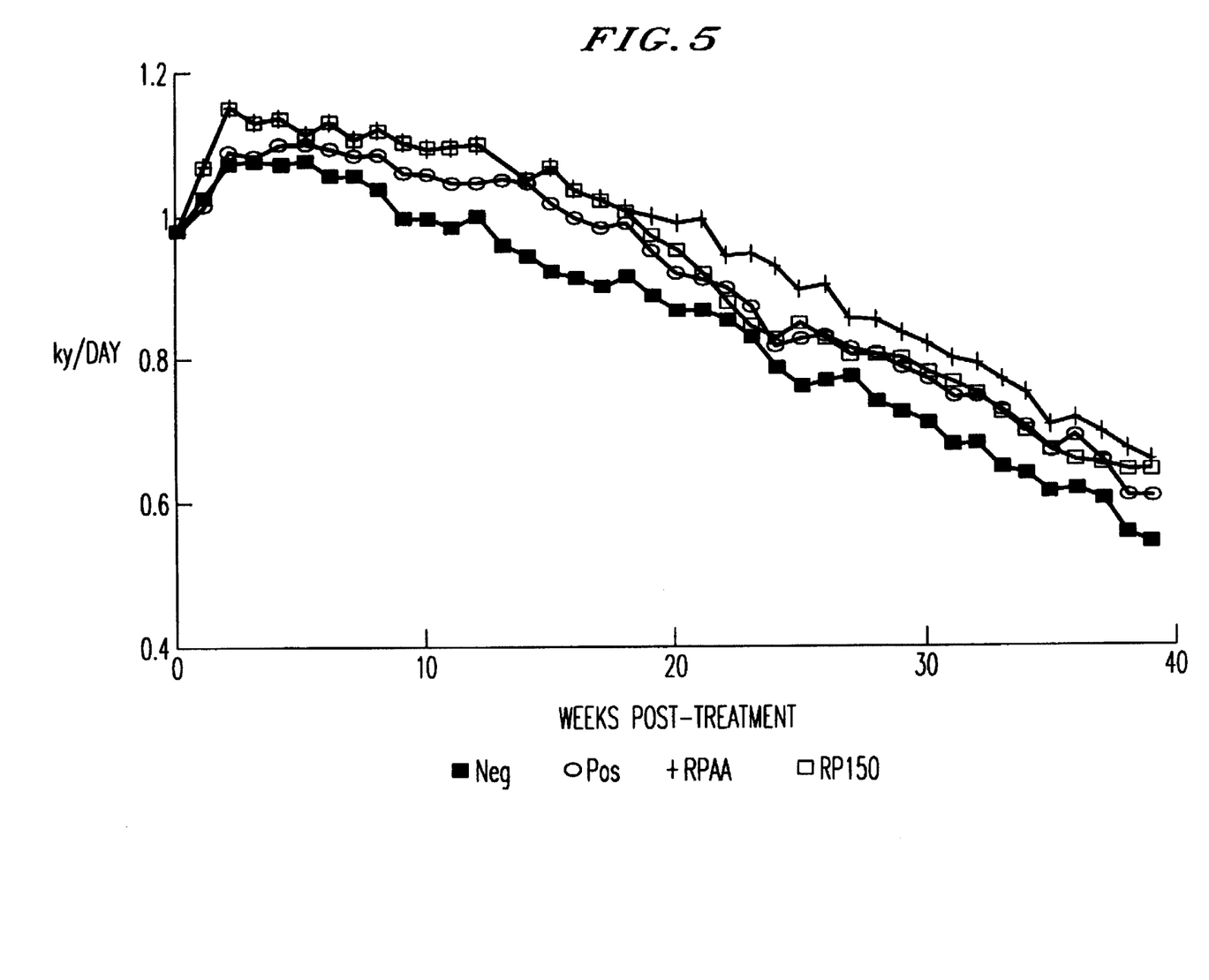
FIG. 5 represents the protein production over time from cows used in Example 4.

The positive response in protein production was observed within two weeks of RPAA supplementation whereas with protein supplementation, it was nine weeks before protein production was greater than for unsupplemented cows (FIG. 5). No differences were observed in milk protein content over the entire experiment. However, milk protein content was greater for RPAA cows compared to NEG cows in early lactation, but the reverse occurred in late lactation. The positive response in milk protein content, to RPAA supplementation, occurred within one week of RPAA supplementation.

Figure 6:
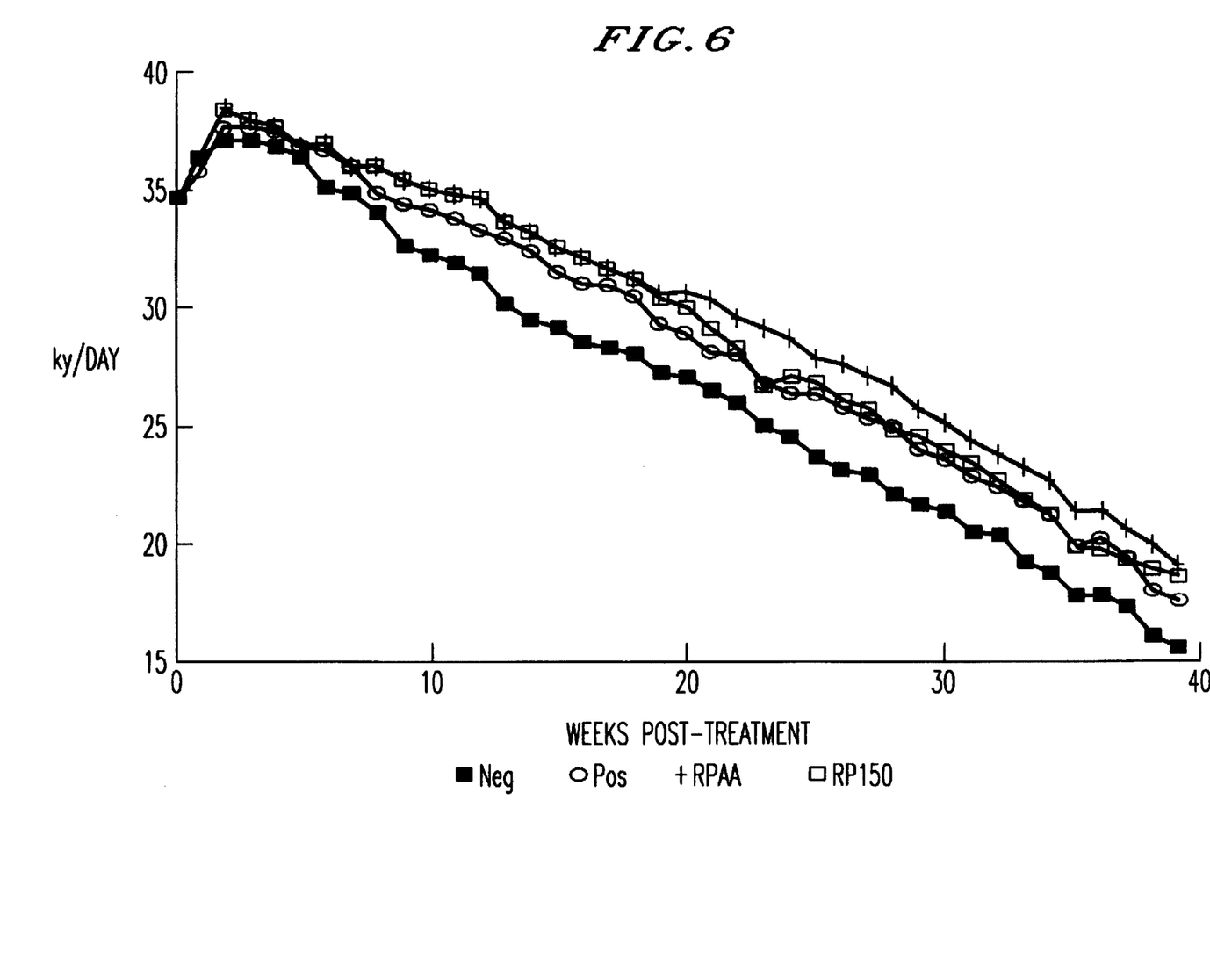
FIG. 6 represents the solids-corrected milk production over time from cows used in Example 4.

Production of solids-corrected-milk (SCM) showed similar results to production of milk volume (FIG. 6).

Supplementing cows with RPAA is an effective means of increasing the yield of milk, milk protein, milk fat, etc.

compared to unsupplemented cows. In fact, RPAA-supplemented cows produced numerically more milk than cows supplemented with much higher levels of bypass protein. Thus RPAA Supplementation is an effective method of providing cows with essential amino acids. This technology will aid dairy producers through increased milk production and decreased feed costs. Rumen protected amino acids will have a positive environmental impact in that they will allow cows to produce the same amount or more milk than a diet much higher in dietary crude protein. This, in turn, will reduce the quantity of nitrogen excreted in manure and the risk of groundwater pollution.

What is claimed is:

1. A method for increasing milk production in ruminant animals comprising feeding said animals a rumen-protected feed additive comprising lysine, methionine or a mixture thereof each day beginning approximately 3 weeks prior to the scheduled parturition date of said ruminant animal and continuing said feeding from 60 to 150 days into the milk production period of said animal, wherein said increased milk production is maintained for at least 23 weeks after removal of said rumen-protect feed additive.

2. A method for increasing in ruminant animals comprising feeding said animals a rumen-protected feed additive comprising lysine, methionine or a mixture thereof each day beginning approximately 1 day after parturition and stopping said feeding 150 days into the milk production period of said animal, wherein said increased milk production is maintained for at least 23 weeks after removal of said rumen-protected feed additive.

3. A method as claimed in claim 1 wherein said rumen-protected feed additive is added to a base feed in an amount sufficient to provide that amount of lysine and methionine required by said animal.

4. A method as claimed in claim 2 wherein said rumen-protected feed additive is added to a base feed in an amount sufficient to provide that amount of lysine and methionine required by said animal.

5. A method as claimed in claim 1, wherein said rumen-protected feed additive consists of a rumen-protected mixture of lysine and methionine.

6. A method as claimed in claim 2, wherein said rumen-protected feed additive consists of a rumen-protected mixture of lysine and methionine.

7. A method as claimed in claim 3, wherein said rumen-protected feed additive consists of a rumen-protected mixture of lysine and methionine.

8. A method as claimed in claim 4, wherein said rumen-protected feed additive consists of a rumen-protected mixture of lysine and methionine.

9. A method as claimed in claim 5, wherein said ruminant animals are dairy cows.

10. A method as claimed in claim 6, wherein said ruminant animals are dairy cows.

11. A method as claimed in claim 7, wherein said ruminant animals are dairy cows.

12. A method as claimed in claim 8, wherein said ruminant animals are dairy cows.

13. A method as claimed in claim 9, wherein said lysine is present in the form of lysine-HCL.

14. A method as claimed in claim 10, wherein said lysine is present in the form of lysine-HCL.

15. A method as claimed in claim 11, wherein said lysine is present in the form of lysine-HCL.

16. A method as claimed in claim 12, wherein said lysine is present in the form of lysine-HCL.

17. A method as claimed in claim 6 wherein feeding is begun 29 days after parturition.

* * * * *